US012612808B2

(12) United States Patent
Reddmann

(10) Patent No.: US 12,612,808 B2
(45) Date of Patent: Apr. 28, 2026

(54) COMBINED MOTOR VEHICLE LOCK

(71) Applicant: KIEKERT AKTIENGESELLSCHAFT, Heiligenhaus (DE)

(72) Inventor: Uwe Reddmann, Essen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 78 days.

(21) Appl. No.: 18/710,827

(22) PCT Filed: Nov. 14, 2022

(86) PCT No.: PCT/DE2022/100848
§ 371 (c)(1),
(2) Date: May 16, 2024

(87) PCT Pub. No.: WO2023/104236
PCT Pub. Date: Jun. 15, 2023

(65) Prior Publication Data
US 2025/0059804 A1 Feb. 20, 2025

(30) Foreign Application Priority Data
Dec. 7, 2021 (DE) ..................... 10 2021 132 120.4

(51) Int. Cl.
*E05B 81/20* (2014.01)
*E05B 81/14* (2014.01)

(52) U.S. Cl.
CPC ............. *E05B 81/20* (2013.01); *E05B 81/14* (2013.01)

(58) Field of Classification Search
CPC .......... E05B 81/20; E05B 81/14; E05B 81/30; E05B 85/01; E05B 85/24
See application file for complete search history.

(56) References Cited

FOREIGN PATENT DOCUMENTS

| | | | | |
|---|---|---|---|---|
| DE | 102008015089 A1 | 10/2008 | | |
| DE | 102011015669 A1 | 10/2012 | | |
| DE | 102014119382 A1 * | 6/2016 | ............ | E05B 81/20 |

(Continued)

OTHER PUBLICATIONS

Machine translation with numbered paragraphs for DE 102014119382 A1 (Year: 2016).*

(Continued)

*Primary Examiner* — Christine M Mills
*Assistant Examiner* — Christopher F Callahan
(74) *Attorney, Agent, or Firm* — Renner, Otto, Boisselle & Sklar, LLP.

(57) ABSTRACT

A method for closing and opening a motor vehicle lock door and to a motor vehicle lock includes a locking mechanism with a rotary latch and at least one pawl, a rotational movement of the rotary latch being lockable in at least one latching position by means of the pawl, a closing device, wherein the locking mechanism can be transferred from a pre-latching position into a main latching position by means of the closing device, and an opening device, wherein a door element can be transferred from a closing position into an open position by means of the opening device, and wherein a coupling element can be controlled by a drive device such that an opening and closing of the door element can be made possible by means of the closing device.

15 Claims, 3 Drawing Sheets

(56) References Cited

FOREIGN PATENT DOCUMENTS

| | | | | | |
|---|---|---|---|---|---|
| DE | 102015003918 | A1 | | 9/2016 | |
| DE | 102018107210 | A1 | | 10/2019 | |
| DE | 102020133915 | A1 | | 6/2022 | |
| EP | 3640419 | A1 | * | 4/2020 | ............ E05B 81/20 |
| WO | 2022127985 | A1 | | 6/2022 | |
| WO | 2023285498 | A1 | | 1/2023 | |

OTHER PUBLICATIONS

Machine translation and numbered paragraphs for EP 3640419 A1 (Year: 2020).*

International Search Report mailed Mar. 15, 2023, for priority International Application No. PCT/DE2022/100848.

* cited by examiner

COMBINED MOTOR VEHICLE LOCK

This application is a national phase of International Patent Application No. PCT/DE2022/100848 filed Nov. 14, 2022, which claims priority to German Patent Application No. 10 2021 132 120.4 filed Dec. 7, 2021, each of which is hereby incorporated herein by reference in its entirety.

FIELD OF DISCLOSURE

The invention relates to a motor vehicle lock comprising a locking mechanism with a rotary latch and at least one pawl, a rotational movement of the rotary latch being lockable in at least one latching position by means of the pawl, a closing device, wherein the locking mechanism can be transferred from a pre-latching position into a main latching position by means of the closing device, and an opening device, wherein a door element can be transferred from a closing position into an open position by means of the opening device.

BACKGROUND OF DISCLOSURE

In order to increase comfort in a motor vehicle and make it as easy as possible to operate, more and more comfort functions are being integrated into the vehicle. For example, it is known that vehicle doors, hatches or hoods are closed by means of a closing device and/or opened by means of an opening device. On the one hand, this can be due to the fact that the door should be easy to close and/or open and, on the other hand, an external door handle can be dispensed with, for example, in order to achieve a corresponding design on the motor vehicle. Closing devices are often used with fully automatic tailgates. These flaps can then be operated, for instance, without manual operation of the flap itself, merely by means of a radio remote control.

Locking systems equipped with a closing device are generally used for all conceivable doors, flaps, etc., on a motor vehicle. This means that not only side doors, but also trunk lids, tailgates, or hoods can conceivably be actuated and are comprised within the scope of the invention. With the help of the closing device, the door or vehicle door in question can be moved from the pre-latching position already mentioned into a main latching position against the resistance of a seal in particular.

In DE 20 2008 015 089 U1, a transmission lever mounted on the same axis as an axis of a rotary latch of the locking mechanism is provided. In addition, a drive pawl is mounted on a transmission element. The drive pawl is in turn connected to the drive by means of a Bowden cable or another means of connection.

In addition to the aid of a pull drive for locking systems in motor vehicles, raising devices have become known. Opening devices, also known as openers, presenters or positioners, are preferably used to move the movable component arranged on the motor vehicle into an open position so that the operator is able to grasp the movable component and open it completely. The opening devices interact with electrically unlockable locking systems in such a manner that the movable component can be set up after the locking mechanism has been electrically unlocked or opened. If the locking mechanism is open, a vehicle door, for example, can be moved into an open position without manually operating an external operating handle.

DE 10 2011 015 669 A1 discloses an opener for motor vehicle doors or flaps with which a door, flap, or hood can be moved from a closing position into an open position. For example, if the opening device refers to a vehicle side door, the door can be opened by means of an electrical impulse. For this, the locking mechanism of the door latch must first be unlocked—preferably electrically—so that the door can be opened. If, for example, the door sealing pressure is not sufficient to move the door from the closing position into an open position, the door can be moved into an open position by means of the opening device. An open position is defined here in such a manner that the operator of the motor vehicle is able to grasp the door in such a manner that they can open the door completely. An electric drive unit is used as the opening device, which acts mechanically on the motor vehicle door in the form of a pivoting movement of the levers via a drive pawl and an inner and outer lever.

DE 10 2015 003 918 A1 discloses a motor vehicle lock comprising a locking mechanism with a rotary latch and at least one pawl, a rotational movement of the rotary latch being lockable by means of the pawl, a drive device with which the pawl can be transferred from a locking position into the release position for the locking mechanism, and an opening device, wherein a vehicle part accommodating the motor vehicle lock can be moved from a closing position into an open position by means of the opening device. In one embodiment, the drive device forms a drive for the opening device. The drive device for electrically opening the motor vehicle latch is preferably an electric motor, which acts on an actuator, for example with a gear, so that the pawl can be released from the catch. If the electric motor in the motor vehicle latch is used as the drive unit for the raising device, there is no need for a further drive for the raising device.

The frequently used prior art closing devices as well as the raising devices have basically proven their worth. One problem that automotive manufacturers, as well as suppliers, are continuously dealing with is that of reducing the weight of motor vehicles and the installation space of components to a minimum. The weight of the individual components can minimize the weight of the vehicle and thus reduce the consumption of the motor vehicle. This is where the invention starts.

SUMMARY OF DISCLOSURE

The object of the invention is to provide an improved motor vehicle with the described comfort functions, such as a closing aid and opening device. Furthermore, the object of the invention is to provide the comfort functions in a minimal installation space and with the smallest possible number of components. Finally, the object of the invention is that of providing a structurally simple and inexpensive solution.

According to the invention, the object is achieved by the features of independent claim 1. Advantageous embodiments of the invention are specified in the dependent claims. It should be noted that the exemplary embodiments described below are not restrictive; rather, any variation of the features described in the description and the dependent claims is possible.

According to claim 1, the object of the invention is achieved by providing a motor vehicle lock comprising a locking mechanism with a rotary latch and at least one pawl, a rotational movement of the rotary latch being lockable in at least one latching position by means of the pawl, and a closing device, wherein the locking mechanism can be transferred from a pre-latching position to a main latching position by means of the closing device, and an opening device, wherein a door element can be transferred from a closing position into an open position by means of the opening device, and wherein a coupling element can be controlled by a drive device such that an opening and closing of the door element can be made possible by means of the closing device.

The structure of the motor vehicle latch according to the invention now makes it possible to use the motor vehicle latch or the components associated with the motor vehicle latch in such a way that, on the one hand, it is possible to close the locking mechanism and, at the same time, the motor vehicle part can be set up in an open position by means of the closing device. The design according to the invention allows the number of components required to move the locking mechanism and the motor vehicle part to be reduced to a minimum. Due to the use of the closing drive for pulling and mounting, comfort functions can be realized with a Minimum of structural components, which at the same time require only a minimal installation space.

According to the invention, when referring to a motor vehicle latch, synonyms such as locking device, lock or door lock are synonymous with each other. The term "motor vehicle lock" also includes locks that are used in doors, sliding doors, hatches and/or covers in motor vehicles, i.e., wherever components that can be pivoted or moved on the vehicle must be held securely in position. A preferred feature of the motor vehicle latch according to the invention relates to a side door latch. Motor vehicle locks of this type comprise a locking mechanism consisting of a rotary latch and a pawl.

The locking mechanism can also be equipped with two or more pawls or, for example, have a detent or blocking lever. Such pawls are known from the prior art. In this case, the pawl engages directly with the catch and the locking or blocking lever secures the position of the pawl in the latching position, preferably the main ratchet position.

In one embodiment, there is an advantage if the drive device is part of the vehicle lock. The drive device is preferably designed with an electric motor and can move the coupling element. A movement of the drive device controls the coupling element such that the closing device makes active contact with the opening device or the closing device. The electromechanical design of the drive device is capable of rendering either the closing device or the opening device inoperative. As part of the vehicle lock, the opening device therefore provides a further function in the vehicle lock. In an advantageous manner, the drive device can be integrated into the vehicle lock. By incorporating the drive device into the motor vehicle lock, a compact design can be realized and further holding devices or device elements can be dispensed with in order to hold the drive device in the motor vehicle. As an integral part of the motor vehicle lock, the current supply required to drive the drive device can also be accessed via the current supply for the motor vehicle lock. This makes it possible to realize a compact and advantageous construction of the vehicle lock in terms of design. In addition to holding the current supply, sealing of the electromechanical drive of the drive device can also be provided by the motor vehicle lock housing. In addition, parts of the drive device can also be accommodated and/or stored in components of the motor vehicle lock, such as a lock plate or a reinforcing plate.

If at least one further function in the motor vehicle lock can be engaged and/or actuated by means of the drive device, a further advantageous embodiment of the invention is achieved. Locking, childproofing, theft protection and electric opening can be mentioned as examples of functions in the vehicle lock, so that the electromechanical construction can be assigned a further function in addition to the movement of the coupling element. This in turn increases compactness and multifunctionality at the same time.

In particular, the use of the drive device to actuate the coupling element can be advantageous. In this case, the locking mechanism can be unlocked by means of the drive device. In other words, the locking mechanism can be moved out of a latching position into a release position. By means of the drive device, a release lever can be preferably actuated, with which the pawl can be moved out of engagement with the catch, so that the locking mechanism can be transferred from a latching position to a release position. After unlocking, the catch usually moves out of the engagement area with the pawl, at least in some areas, because the catch is under spring load from a leg spring and/or the door seal pressure.

The drive device is equipped with an electric drive, in particular an electric DC motor, so that the release lever can preferably be moved by means of a gearbox. According to the invention, the drive device additionally drives a coupling element, whereby the coupling element can be used to couple the closing device to a means for setting up the vehicle part. The electric drive of the drive unit is thus used in a dual function for unlocking the locking mechanism and operating the coupling element. Consequently, the existing components of the closing device and the drive device can also be used to unlock the vehicle part.

According to a development of the invention, an advantage can be achieved if the closing device is accommodated in the motor vehicle at least in regions or completely independently of the motor vehicle latch. The closing device can be part of the motor vehicle latch itself, i.e. the closing device is integrated into the housing of the motor vehicle latch. For this purpose, the closing device preferably has a suitably powerful electric drive, by means of which the locking mechanism can be transferred from a pre-ratchet position to a main ratchet position. An appropriate design of the closing drive is necessary, since the locking mechanism must be moved against the sealing pressure of the door or flap. The main ratchet position represents the closed position of the locking mechanism and describes the position in which the movable component is held in the secured position on the motor vehicle latch. However, the closing drive can also be integrated only in regions into the lock or be mounted on the latch. A mechanical connection can then take place via levers, a linkage or via a Bowden cable. In any case, the closing device can initiate a closing movement into the locking mechanism. However, it is also possible in accordance with the invention for the closing device to be arranged at a distance from the locking device in the motor vehicle latch. This can be particularly advantageous if the motor vehicle latch is installed in a side door and sufficient installation space is not available in the vicinity of the motor vehicle latch for positioning the closing device. In this case, it is known to connect the pull drive to the motor vehicle latch or a drive device in the motor vehicle latch by means of a Bowden cable.

The coupling device is preferably integrated into the vehicle lock and is actuated by means of the drive device. The coupling device is designed in such a manner that the existing closing drive can be mechanically coupled with an opening device in the vehicle lock. In this case, the raising device can make use of existing components in the motor vehicle latch, at least in some areas, and enables the movable component to be moved into an open position. If the vehicle lock is unlocked by means of the drive unit, the rotary latch is under preload and is preferably moved out of the main latching position by the door seal pressure. Depending on the door seal pressure and design conditions, the movable component can move into the open position, at least in certain areas. The raising device, on the other hand, moves the movable component into a fixed open position, which is characterized by the fact that a gap is created into which the operator of the motor vehicle can safely reach in order to fully open the motor vehicle door, for example.

The open position, which can be reached by achieving a fixed opening gap, is therefore clearly different from opening the movable component by releasing the rotary latch. In particular, for example, when an additional force is exerted on the movable component by, for example, a tilted position of the motor vehicle, which presses a side door into a closed position, for example. This can be gravity, for example, but can also be generated by external environmental influences, such as a strong wind. The opening position, on the other hand, is achieved by the raising device, whereby the movable component is moved into a defined position.

The closing device can be mechanically coupled to the raising device by means of the coupling element. The closing device is engaged in the mechanics of the raising device by means of the drive unit. For this purpose, the drive unit preferably has a gear downstream of the electric drive, which lifts the pawl off the catch either directly or via a separate release mechanism. After this unlocking of the locking mechanism, the electric drive of the drive device can be used to couple or uncouple the closing device with the opening device. The closing drive can initiate a movement in the opening device, wherein, for example, a Bowden cable initiates a pulling movement in the motor vehicle lock, which is used to actuate the mechanism for positioning the movable component. For this purpose, for example, the gearbox of the drive device downstream of the electric motor can be used in that the gearbox, for example, moves the release mechanism to a position in which the release mechanism couples the closing drive to the raising device. After coupling the raising device, the mechanism for positioning the movable component is able to move the movable component into the opening position.

If the movable component is now gripped and opened by the operator, the opening device can be moved back to its initial position, wherein the drive device is also moved back into its initial position and the closing drive is coupled again with the closing mechanism for the locking component. The closing mechanism is then available for closing the locking mechanism. This means that the simplest mechanical means and the smallest possible number of components can be used to close and open the door and optionally to unlock it electrically.

A further embodiment of the invention arises when the vehicle part arranged movably on the motor vehicle can be held by means of an opening device positioner. The opening device has a positioner that is retractable from an initial position into a position in which the positioner has moved the movable vehicle part into the opening position. In accordance with the invention, it is conceivable that the positioner holds the part of the vehicle arranged movably on the motor vehicle, i.e. fixes it in the open position. Preferably, the positioner is arranged in its initial position in the motor vehicle lock in such a manner that the positioner does not protrude beyond an outer vehicle body of the motor vehicle or a panel of the vehicle part. In this initial position, therefore, no obstruction of the operator of the motor vehicle can occur or injuries can be sustained. If the opening device moves the positioner, the positioner is moved from the starting position to the extended operating position. In this operating position, the positioner can hold the vehicle part.

It can also be advantageous if the positioner can be brought into engagement with a lock holder. In an advantageous manner, the positioner can be arranged in the vehicle lock in such a manner that the positioner is arranged, for example, parallel to the locking mechanism and preferably parallel to the rotary latch in the vehicle lock. The catch engages with the lock holder or lock holder bracket and secures the position of the pivoting component during operation of the motor vehicle. If the stand is now also brought into engagement with the lock holder, an advantageous design variant can be achieved. This is advantageous in that no further opening needs to be arranged in the vehicle lock, as the positioner can be brought into engagement with the lock holder through the inlet mouth of the rotary latch. It is also advantageous in that the lock holder is arranged at a distance from the door seal in the motor vehicle, for example, and therefore the smallest possible movement of the positioner is suitable for moving the movable motor vehicle part into the opening position.

In a further variant of the invention, the closing mechanism is directly engageable with the catch. The closing mechanism or closing device can be engaged with the smallest possible number of structural components and thus directly with the catch. Decoupling the closing device plays a decisive role here, as the catch can be moved independently after decoupling from the closing device. In other words, the catch is released from the closing mechanism. This achieves easy movement of the locking mechanism and prevents noise. The closing device is only engaged by means of the coupling when the catch is in the release position, i.e. when the raising device is in engagement with the closing device. The decoupling of the closing device therefore offers structural and acoustic advantages. Similarly, the opening device is only coupled by means of the closing device when the positioner is set up or reset and is decoupled during closing. Coupling is performed mechanically and preferably by means of a gearbox connected downstream of the electric drive of the drive unit. Of course, it is also possible for a separate coupling element to be actuated, whereby the coupling element couples the Bowden cable to the closing drive or the raising device, for example.

The catch can be transferred from the release position into a latching position, in particular a main ratchet position, by means of the closing mechanism. If the closing mechanism, that is, the motor vehicle latch according to the invention, is installed in a side door of a motor vehicle, the closing mechanism moves the catch from a pre-ratchet position to a main ratchet position. However, there are also cases, for example with covers or tailgates, in which there is only a detent position in the locking mechanism. In these cases, the catch immediately engages with a lock holder as soon as the motor vehicle latch approaches the locking bolt. In this case, the closing device moves the catch from the contact position on the lock holder to the latching position.

It can also be advantageous if the coupling is designed as a mechanical coupling with a sliding element. The coupling device has, for example, a sliding element in which a mechanical connection of the closing drive can be guided linearly. A linear guide can be easily and safely produced and can be guided in the lock housing itself, for example. Therefore, the number of components required is reduced to a Minimum.

If the coupling device has a coupling for a Bowden cable holder of the closing device, this results in a further embodiment of the invention. The closing drive or closing device can interact with the closing system by means of a Bowden cable, so that a spaced arrangement of the closing device in the vehicle is possible in an advantageous manner. If the coupling device has a Bowden cable holder and the Bowden cable holder can move in a, for example, pivoting movement or can displace in the coupling device, it is possible to advantageously engage the closing mechanism or the opening mechanism. In particular, a connection of the coupling device to a gearbox of the drive device and, for example, a mechanical system associated with the drive device, such as a gearwheel, can be a structurally favorable way to enable coupling. The pivoting movement of the gearbox of the drive device can then be used to connect the Bowden cable of the closing device to the raising device or the catch or the closing mechanism.

An advantageous and preferred embodiment of the invention is achieved when the coupling element is pivotably integrated in the motor vehicle lock. In this embodiment, a separate coupling element is driven by an electromechanical system. The coupling element can, for example, be mounted on a lock plate and/or a reinforcing plate in the vehicle lock. This means that an existing component in the vehicle lock can be used to bear the coupling element, which in turn reduces the number of components required. It can be advantageous if the coupling element has at least one control pin, preferably two control pins, wherein the control pin can be guided in a control contour. The preferably pivoting movement of the coupling element is mounted in the vehicle lock and is able to establish an active connection between the closing device or the drive device by means of the at least one control pin. The displacement of the control pin within the control contour provides a safe way of guiding the coupling element.

If the opening device has a lever mechanism, the positioner can be brought into engagement with the lock holder using simple design means. In particular, it is possible to redirect the movement of the closing drive into a linear movement of the positioner and, at the same time, provide sufficient force via the lever mechanism to raise the movable component, in particular the side door. The coupling element can be designed as a pivotably mounted coupling lever, which can be mounted on an actuating mechanism of the closing drive. For this purpose, the closing mechanism can impact on an operating lever with a Bowden cable, on which the coupling lever is pivotably mounted. The operating lever can then also accommodate the control contour, so that by moving the coupling lever within the control contour and with the help of the control pin, it is possible to switch or engage and disengage between the opening device and the closing mechanism inside the vehicle lock.

The object of the invention can be solved by means of a method. For this purpose, according to the invention, a method is provided for closing a motor vehicle part of a motor vehicle which can be closed by means of a motor vehicle latch, in which a latch of the motor vehicle latch is unlocked by means of a drive device and the vehicle part is transferred into a latching position by means of a closing device, and in which the closing device is then coupled to a raising device by means of the drive device. The method according to the invention now makes it possible to use the closing drive arranged in the motor vehicle latch or on the motor vehicle latch also for setting up the component movably attached to the motor vehicle. The method according to the invention makes use of the possibility of coupling the closing drive with the installation device by means of a coupling element and therefore performing the two functions by means of one drive. After unlocking the locking mechanism, the drive device interacts with the coupling in such a manner that the closing drive is coupled with the opening mechanism or the opening device so that the movable vehicle part can be opened. After the opening device's positioner has been set up and retracted, the opening device is again decoupled from the closing device by means of the drive device and connected to the closing mechanism or directly to the rotary latch. In turn, pulling of the catch is possible.

BRIEF DESCRIPTION OF DRAWINGS

The invention is explained in more detail below with reference to the accompanying drawings and sketches. However, the principle applies that the embodiment does not limit the invention, but is merely an advantageous embodiment. The features depicted can be implemented individually or in combination with further features of the description as well as what is claimed—individually or in combination.

In the figures.

DETAILED DESCRIPTION

Figure 1:
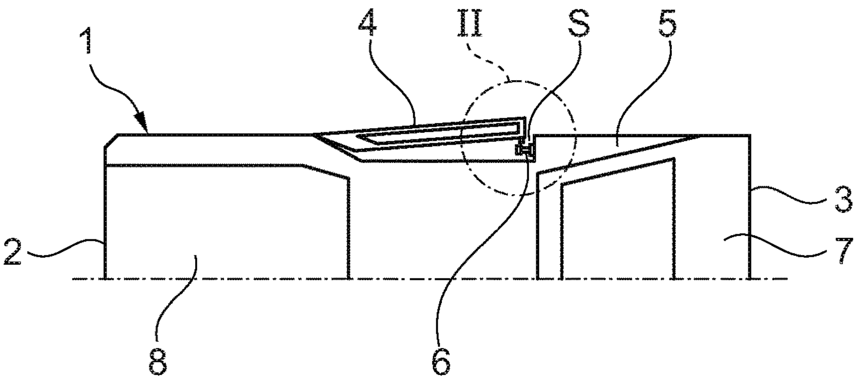
FIG. 1 shows a top view of a motor vehicle with a side door in an open position.

FIG. 1 shows a top view of a motor vehicle 1 shown in principle. The motor vehicle 1 has a front area 2, a rear area 3 and a side door 4. The motor vehicle side door 4 is shown in an open position, wherein the open position is characterized by the fact that there is an opening gap S between the motor vehicle body 5 and the side door 4. In the area of the opening gap S, a lock holder 6 can be seen, which in this exemplary embodiment is designed as a locking bolt 6. Even though in this exemplary embodiment the raising device is reproduced using the example of a motor vehicle door 4, this is not limiting. It is also possible to use the raising device, for example, for a tailgate 7 located in the rear of the motor vehicle 3 or, for example, for an engine hood 8 located in the area of the front of the motor vehicle.

Figure 2:
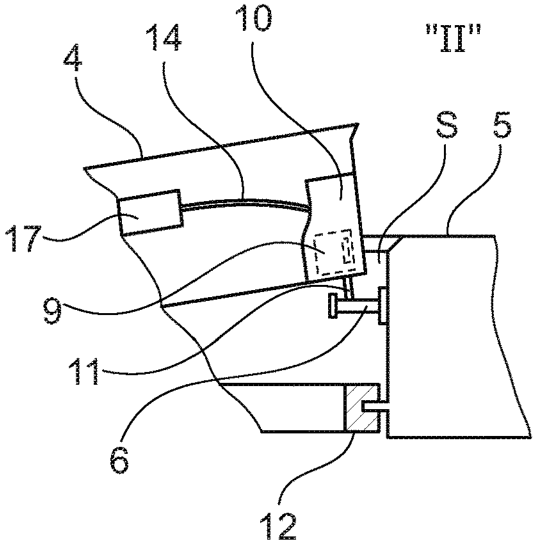
FIG. 2 shows a detailed view of the side door in the open position in accordance with FIG. 1 and, in particular, View II, in a sectional view showing the basic arrangement between a motor vehicle lock located in the side door and an opening device, wherein the opening device interacts with a lock holder.

FIG. 2 shows an enlarged view of detail II from FIG. 1 in the area of the lock holder 6. Identical components are given the same reference numbers in the figures. For better clarification of the arrangement of the raising device 9, detailed view II is reproduced in a section through the motor vehicle 1 above the latch holder 6. The opening device 9 is integrated into a vehicle door lock 10 and has a positioner 11, wherein the positioner 11 interacts directly with the lock holder 6. In this exemplary embodiment, the positioner 11 is integrated and movably arranged in such a manner in the opening device 9 so that the positioner 11 can be moved out of the motor vehicle door lock 10 and the motor vehicle door (4). A door seal 12 is attached to a bend 13 of the motor vehicle body 5. The door seal 12 preferably circumferentially surrounds the motor vehicle door 4 and seals the interior of the motor vehicle 1 from the environment. In addition to this sealing function, the door seal 12 generates a force on the door lock integrated in the vehicle door 4 and particularly the locking mechanism, provided that the vehicle door 4 is in the fully closed position.

This door seal pressure can be used by the motor vehicle door latch 10 to open the latch by merely removing the pawl from the catch and allowing the door seal force or door seal pressure to cause the catch to move, that is, to open the locking mechanism. Subsequently, the opening device 9 moves the vehicle door 4 completely into the open position, resulting in the opening gap S.

Figure 3:
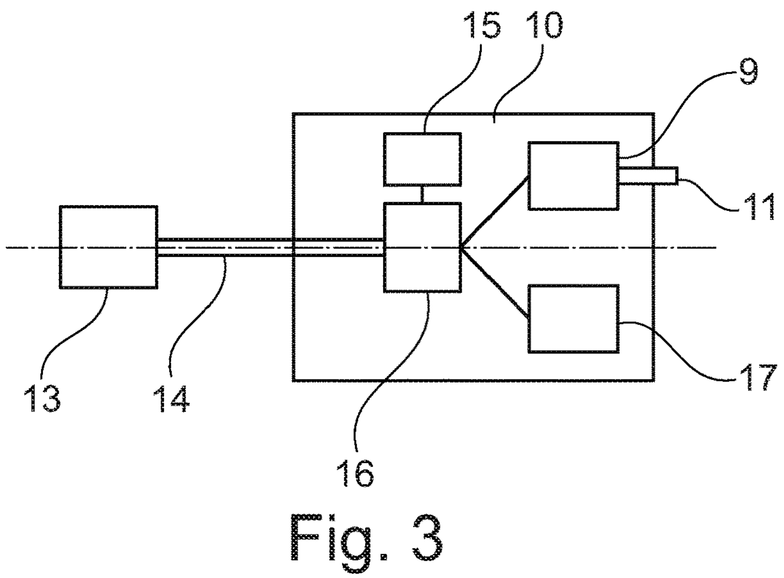
FIG. 3 shows a schematic sketch of the interaction between the closing drive, drive device, coupling element, closing mechanism and opening mechanism.

FIG. 3 now shows in principle the arrangement of the motor vehicle door latch 10 in relation to a closing device 13. The closing device 13 is arranged here at a distance from the motor vehicle latch 10, and is connected to the motor vehicle latch 10, for example by means of a Bowden cable 14. A drive device 15, a coupling element 16, a closing mechanism 17 and an opening mechanism 18 are integrated in the motor vehicle lock 10. A positioner 11 is retractable out of the motor vehicle lock 10 and into the motor vehicle lock 10.

If the vehicle lock 10 or the vehicle door 4 is now in the position shown in FIG. 2, the closing device 13 is connected to the opening mechanism 9 via the coupling element 16. The positioner 11 is in an extended position. If the vehicle door 4 is now gripped by the operator and fully opened, the closing device 13 moves the positioner 11 back into the retracted position to the starting position. Subsequently, the coupling element can be actuated by means of the drive device 15, and the closing device 13 can be coupled to the closing mechanism 17.

If the operator now moves the motor vehicle door back to the closed position, with the catch moving to a pre-ratchet position, the closing device 13 and the associated closing mechanism 17 can be used to transfer the locking mechanism from a pre-ratchet position to a main ratchet position. The closing device 13 can therefore be used as required to pull or set up the motor vehicle door. In other words, the force flow of the actuator or the closing device 13 can be coupled to the respective functional components 17, 9 via the coupling element 16. No additional actuator is required for this, as the drive device 15, for example, which usually initializes an electrical opening, is used to couple the closing or opening mechanism 17, 18.

According to the invention, the closing device 13 can therefore be used to set up the side door 4 and to pull the locking mechanism. Both comfort functions are thus performed by existing components, so that comfort functions can be provided with a minimum of design means, with little installation space and thus cost-effectively.

Figure 4:
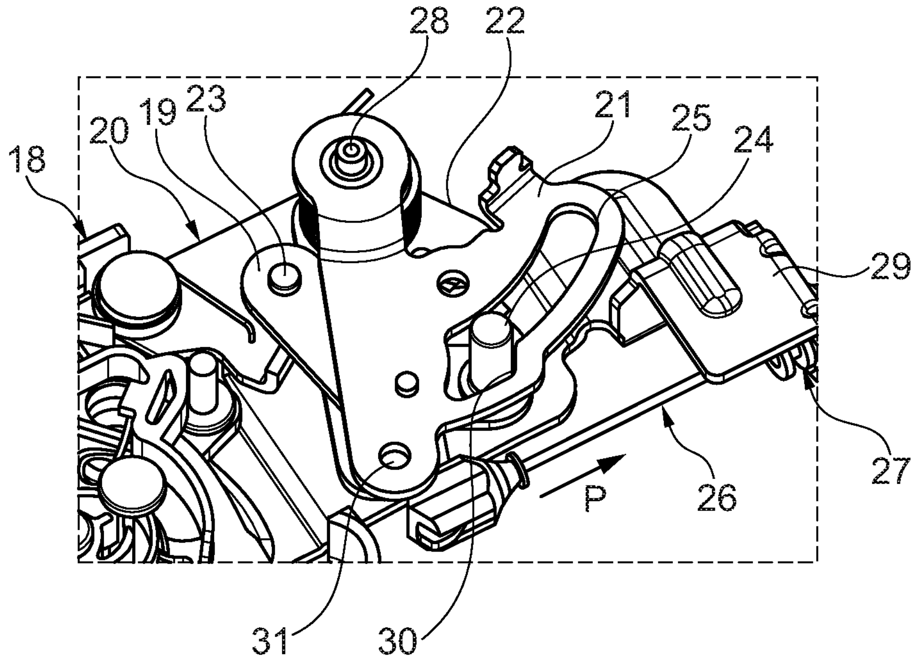
FIG. 4 shows a three-dimensional view of a coupling element designed according to the invention as an integral component of a motor vehicle lock, with the positioner in the functional position.

FIG. 4 shows an example of a motor vehicle lock 18 designed in accordance with the invention, with the components that are substantially essential for explaining the invention. The motor vehicle lock 18 is shown in the area of the coupling element 19, wherein the coupling element is arranged between a closing device 20 and an opening device 21. The coupling element 19 is pivotably mounted on an operating lever 22 as part of the closing device 20. The coupling lever 19 is provided with two bolts 23, 24, wherein the bolts 23, 24 can be brought into engagement with the closing device 20 on the one hand and with the opening device 21 on the other. For this purpose, the opening device 21 has a control contour 25 in which the bolt 24 can be pivoted, inserted, or released. The operating lever 22 is connected to a Bowden cable 26, so that a drive 27 of the closing device 20 can apply a force to the operating lever 22. For this purpose, the Bowden cable can be actuated in the direction of arrow P.

The operating lever 22 and the opening device 21 are mounted in a lock case 29 of the motor vehicle lock 18 via a common axle.

FIG. 4 shows the position of the coupling lever 19 in which the bolt 24 of the coupling lever 19 is engaged with the opening device 21. The bolt 24 is in engagement with the control contour 25 at a stop surface 30. If the Bowden cable 26 is now moved in the direction of the arrow P, a force of the Bowden cable can be transmitted to the opening device 21 via the operating lever 22 and the bolt 24. The opening device 21 has a connecting element 31 in the form of a bore in which a lever mechanism, to be explained below, engages. When the opening device 21 is actuated, the opening device 21 is moved counterclockwise around the axis 28 so that a lever mechanism in the motor vehicle lock 18 can be actuated.

Figure 5:
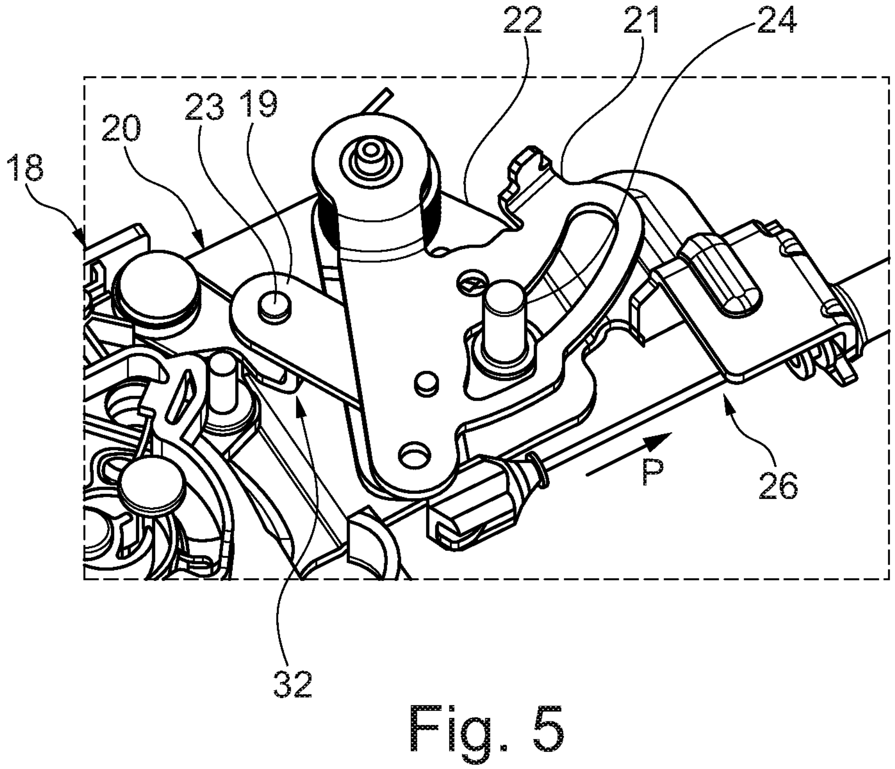
FIG. 5 shows a three-dimensional view of a coupling element designed according to the invention as an integral component of a motor vehicle lock, in the functional position of closing

FIG. 5 now shows the motor vehicle lock 18 in a position in which the coupling lever with its bolt 23 makes a connection to the closing mechanism 32 in the motor vehicle lock 18. The coupling lever 18 has been pivoted counterclockwise on the operating lever 22 so that the bolt 24 is disengaged from the stop surface 30 and can pivot freely. The opening device 21 is therefore prevented from being driven, as the bolt 24 is disengaged. If the Bowden cable 26 is now moved in the direction of arrow P, the closing mechanism 20 is actuated and the locking mechanism is transferred from a pre-latching position to a main latching position.

Figure 6:
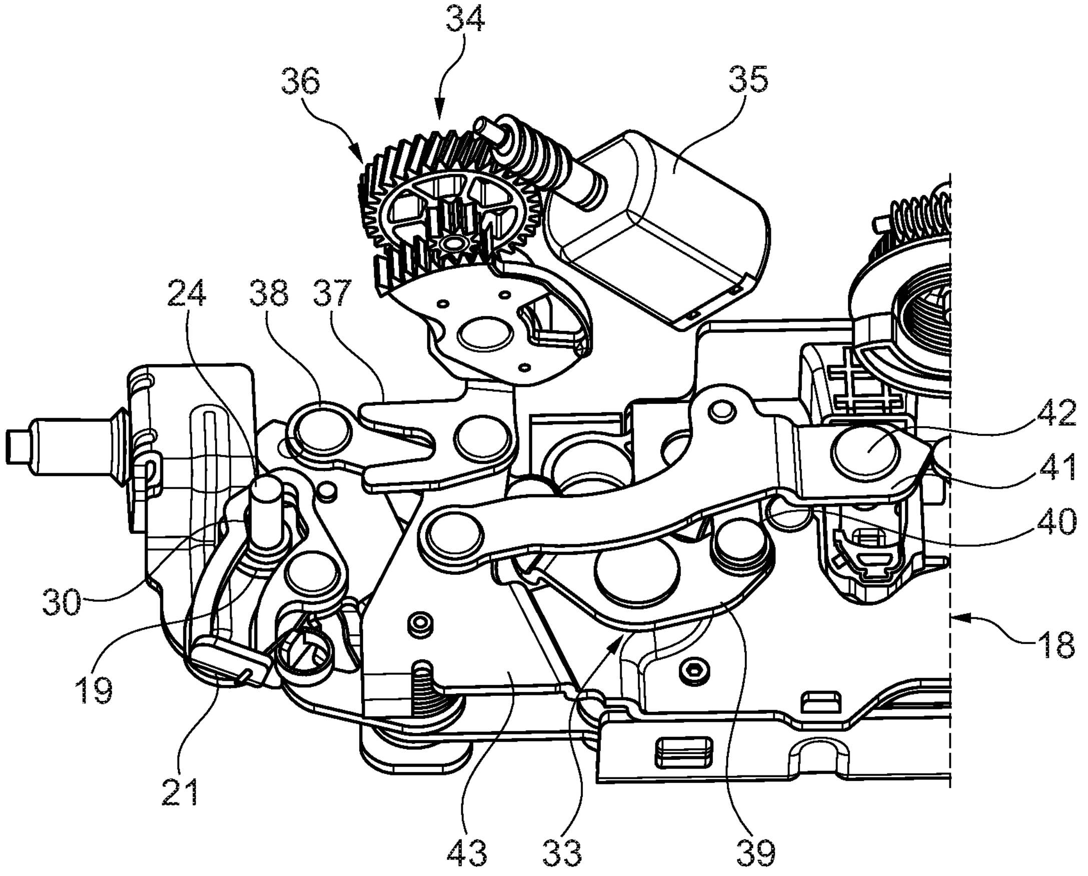
FIG. 6 shows a three-dimensional view of a motor vehicle lock designed according to the invention with an actuated opening device.

FIG. 6 shows a three-dimensional view of the vehicle lock 18 with the opening mechanism 33. Shown is a drive device 34 consisting of an electric motor, a gearbox 36 and a fork-shaped actuating means for actuating the coupling element 19. By means of the actuating means 37, the bolt 24 was brought into engagement with the opening device 21 in the functional position shown. The actuated position of the opening device 21 is shown, as well as the opening mechanism 33 as a lever mechanism in the vehicle lock 18. A positioner 42 can be actuated via the levers 38, 39, 40, 41, wherein the positioner 42 can be brought into engagement with the lock holder 6. With regard to the lever mechanism 38, 39, 40, 41, it should be noted that the levers 39 and 41 are pivotably mounted in a reinforcing plate 43, but in a fixed axis in the motor vehicle lock 18. The lever 38 is connected to the connecting element 31 and pivots the lever 39. The pivoting movement of the lever 39 causes the lever 41 to pivot via the lever 40, wherein the pivoting of the lever 41 results in an almost linear movement of the positioner 42.

By means of the construction of the motor vehicle lock 18 according to the invention, the closing drive 13, 20 or the closing device 13, 20 can be used to position a door element, wherein the coupling element 19 can be brought into engagement with the closing device 13, 20 or the opening device 9, 21 by means of the drive device. As shown, existing components in the motor vehicle lock 18 can be used to realize the function according to the invention, whereby a cost-effective construction and a compact design with high functionality can be realized.

LIST OF REFERENCE NUMBERS

1 motor vehicle
2 front area

3 rear area
4 motor vehicle door
5 vehicle body
6 lock holder
7 tailgate
8 hood
9, 21 opening device
10, 18 motor vehicle lock
11,42 positioner
12 door seal
13, 20 closing device
14, 26 Bowden cable
15, 34 drive device
16, 19 coupling element
17,32 closing mechanism
22 operating lever
23, 24 bolt
25 control contour
28 axle
29 lock case
30 stop surface
31 connecting element
33 opening mechanism
35 electric motor
36 transmission
37 actuating means
38, 39, 40, 41 lever
S opening gap
P arrow

The invention claimed is:

1. A motor vehicle lock comprising:

a locking mechanism with a rotary latch and at least one pawl, a rotational movement of the rotary latch being lockable in at least one latching position by the pawl, a closing device, wherein the locking mechanism is transferred from a pre-latching position into a main latching position by the closing device, an opening device, a door element, and a coupling element, wherein the door element is transferred from a closing position into an open position by the opening device, and wherein the coupling element is controlled by a drive device such that an opening and closing of the door element is controlled via the closing device, and wherein the coupling element is a coupling lever, and the coupling lever is mounted on an operating lever for the closing device.

2. The motor vehicle lock according to claim 1, wherein the drive device is part of the motor vehicle lock.

3. The motor vehicle lock according to claim 1, wherein the drive device is integrated into the motor vehicle lock.

4. The motor vehicle lock according to claim 1, further comprising at least one further function element, wherein the at least one further function element is engaged and/or actuated by the drive device.

5. The motor vehicle lock according to claim 1, wherein the closing device is accommodated at least partially in the motor vehicle lock or completely independently of the motor vehicle lock in the motor vehicle.

6. The motor vehicle lock according to claim 1, wherein an operative connection between the opening device and the closing device is provided by the coupling element.

7. The motor vehicle lock according to claim 1, wherein the closing device is mechanically coupled to the opening device by the coupling element.

8. The motor vehicle lock according to claim 1, further comprising a positioner for the opening device, wherein the door element is held by the positioner for the opening device.

9. The motor vehicle lock according to claim 8, further comprising a lock holder, wherein the positioner is engageable with the lock holder.

10. The motor vehicle lock according to claim 8, wherein the positioner is arranged parallel to the rotary latch.

11. The motor vehicle lock according to claim 1, wherein the coupling element is a mechanical coupling with a sliding element.

12. The motor vehicle lock according to claim 1, wherein the coupling element is pivotably received in the motor vehicle lock.

13. The motor vehicle lock according to claim 1, wherein the coupling element has at least one control bolt, and the at least one control bolt is guided in a control contour.

14. The motor vehicle lock according to claim 1, wherein the opening device has a lever mechanism.

15. The motor vehicle lock according to claim 1, wherein the closing device directly engages with the rotary latch.

* * * * *